June 24, 1969  J. R. BRISSON  3,451,571
REFUSE COLLECTION
Filed Sept. 27, 1967  Sheet _1_ of 3
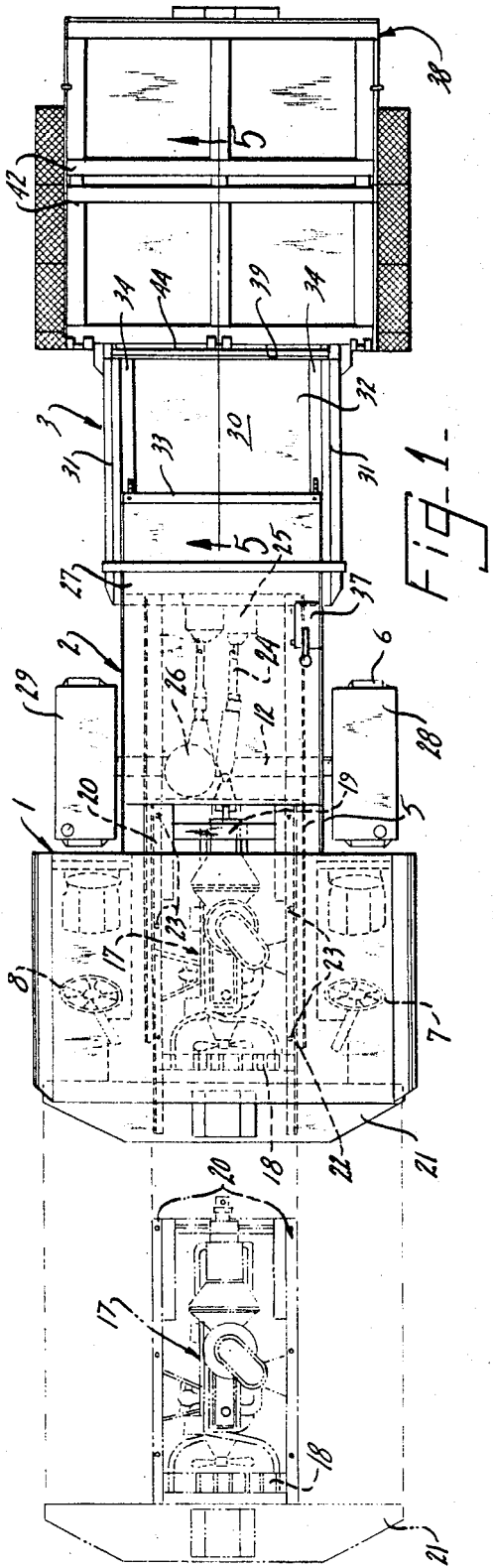
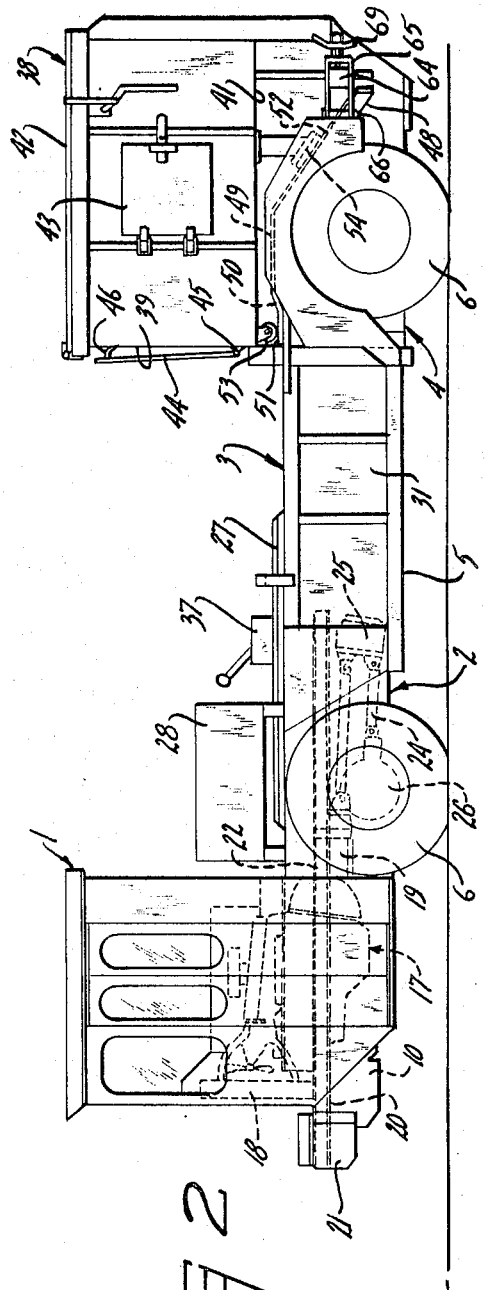
INVENTOR
JOHN R. BRISSON
BY
Andrus & Starke
Attorneys

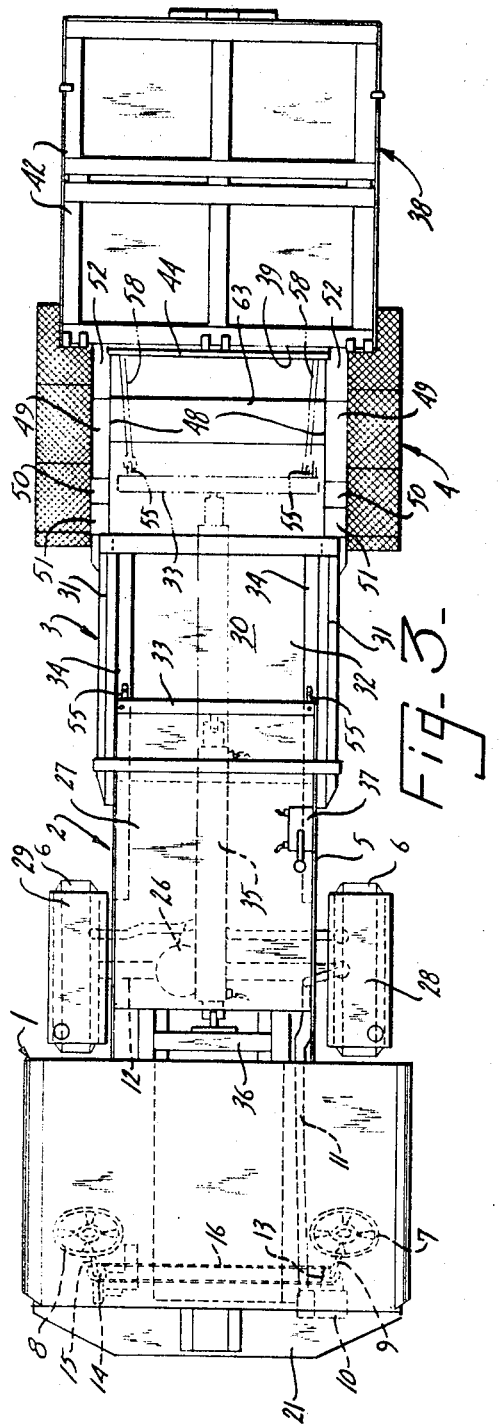
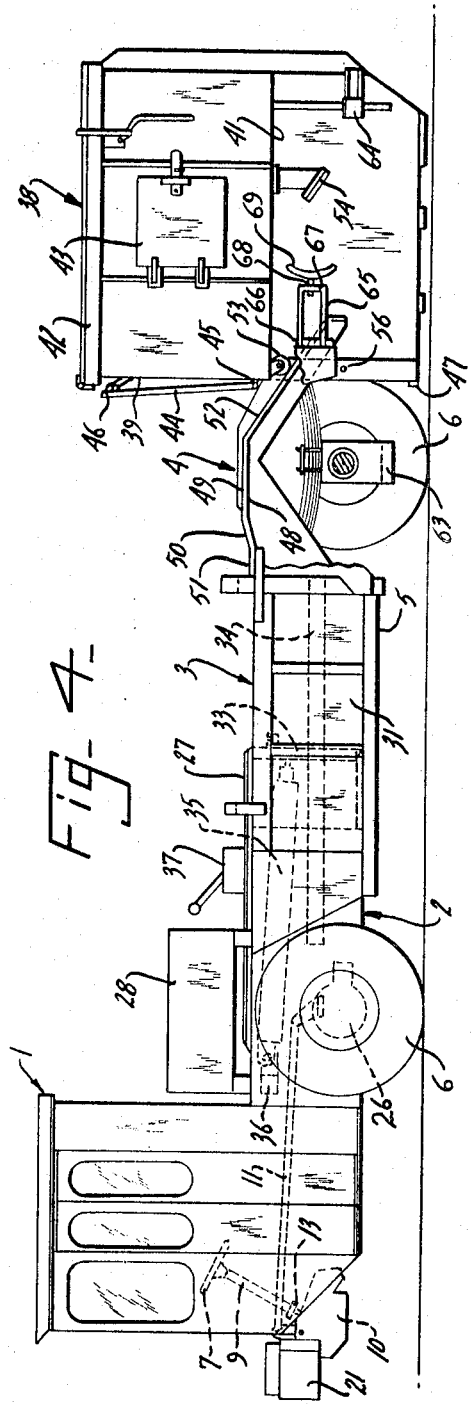
Fig. 3.
Fig. 4.
INVENTOR
JOHN R. BRISSON
BY
Andrus & Starke
Attorneys June 24, 1969  J. R. BRISSON  3,451,571
REFUSE COLLECTION
Filed Sept. 27, 1967  Sheet 3 of 3
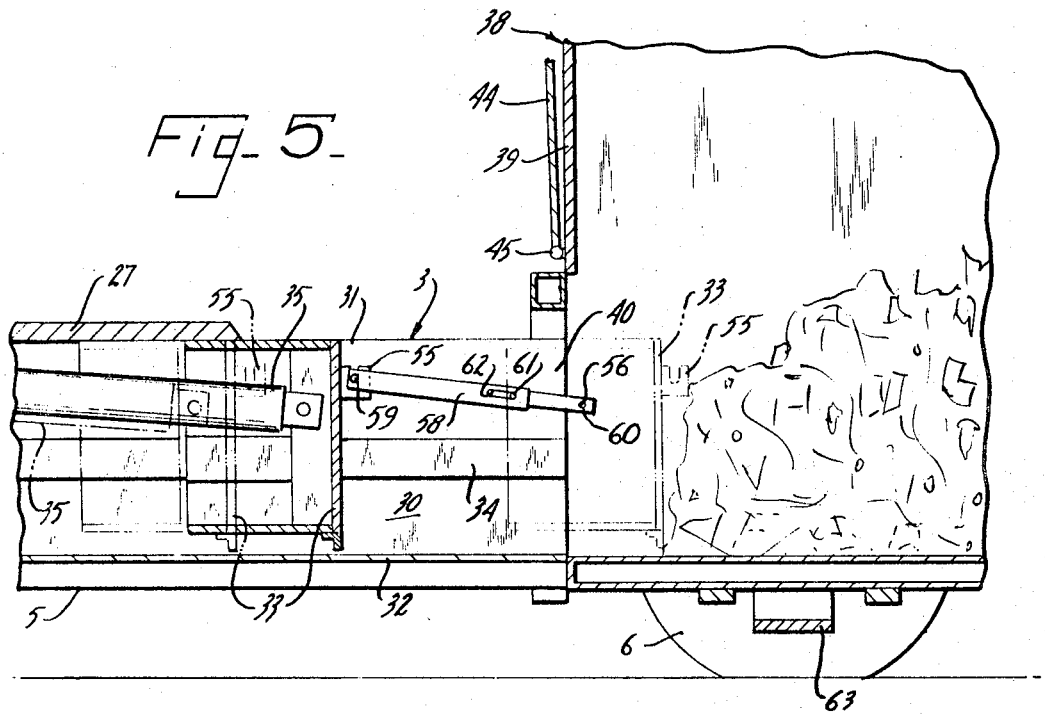
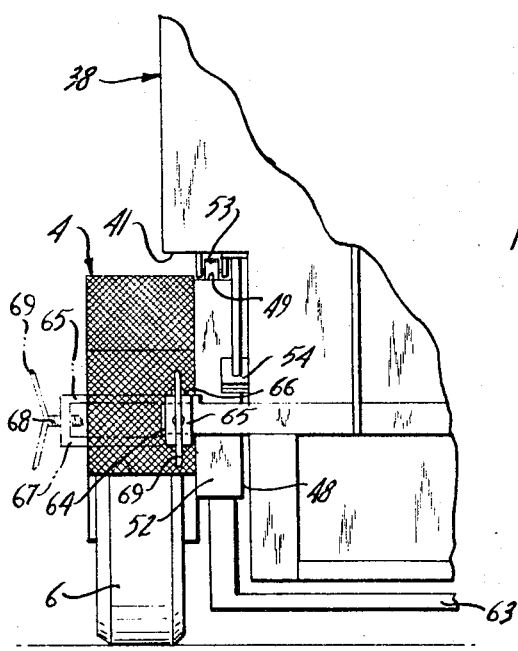
INVENTOR.
JOHN R. BRISSON
BY
*Andrus & Starke*
Attorneys

United States Patent Office 3,451,571
Patented June 24, 1969

3,451,571
REFUSE COLLECTION
John R. Brisson, Kingsford, Mich., assignor to Lodal Inc., Kingsford, Mich., a corporation of Michigan
Filed Sept. 27, 1967, Ser. No. 670,934
Int. Cl. B60p 1/64, 1/00, 3/00
U.S. Cl. 214—516                                    19 Claims

ABSTRACT OF THE DISCLOSURE

A refuse collection vehicle having a cab with interconnected dual steering wheels. An assembly comprising the engine, radiator, transmission and bumper is slideably removable forwardly as a unit from the chassis frame. A hopper forms a portion of the vehicle and a compaction platen slides rearwardly through the hopper to push refuse into an opening in a refuse container. The container is movable onto and off of the rear end of the vehicle, and has rollers and/or skid shoes which ride on inclined rails on the vehicle. Detachable link bars connect the platen with the container, and platen movement moves the container. A channel and bolt mechanism locks the con-tainer in place.

---

This invention relates to refuse collection, and more particularly to a vehicle for receiving, compacting and storing refuse.

Heretofore, top-loading vehicles have been provided which receive refuse which is manually dumped into a vehicle hopper. A compaction unit then pushes the refuse from the hopper into a receiving container. The container may or may not be separable from the vehicle. See U.S. Patents 2,961,105 and 3,230,868.

The present invention is generally directed to a somewhat similar structure, and wherein the container is loaded onto the vehicle or removed therefrom by a power system contained on the vehicle itself.

The accompanying drawings illustrate the best mode presently contemplated by the inventor for carrying out the invention.

In the drawings:

FIGURE 1 is a top plan view of a vehicle constructed in accordance with the invention, and showing two positions of the engine assembly;

FIG. 2 is a side elevation of the vehicle;

FIG. 3 is a top plan view of the vehicle, showing the steering mechanism and showing the removable refuse storage container in pre-loading position;

FIG. 4 is a side elevation of the vehicle of FIG. 3;

FIG. 5 is an enlarged longitudinal central section taken on line 5—5 of FIGURE 1; and FIG. 6 is a fragmentary rear end elevation, showing the container locking mechanism.

As shown in FIGURES 1 and 2 of the drawings, the refuse collection vehicle comprises generally a forward engine and cab section 1, an intermediate section 2, a loading hopper section 3 disposed rearwardly of section 2, and finally a refuse container supporting section 4.

The various vehicle sections are supported on a suitable chassis frame 5 which extends the length of the vehicle and which in turn is suitably supported for transporting purposes by the vehicle wheels 6.

The engine and cab section 1 is designed to contain two drivers and is provided with left and right hand steering wheels, 7 and 8 respectively. As shown in FIGS. 3 and 4, the shaft 9 for left steering wheel 7 is connected at its lower end to a suitable steering gear box 10 of any well-known type. Box 10 is in turn connected through a drag link 11 to front axle 12 to turn front wheels 6, thus providing front wheel steering.

Means are provided to directly connect steering wheels 7 and 8 together on a 1 to 1 turning ratio, so that either driver in the cab may control the steering at will. For this purpose, a sprocket 13 is fixedly mounted on the lower end portion of steering wheel shaft 9 just above gear box 10. A similar sprocket 14 is mounted on the lower end portion of the right steering wheel shaft 15. Sprockets 13 and 14 are horizontally aligned with each other, and a suitable endless roller chain 16 joins them. Thus, turning of either steering will cause the shaft 9 to turn to actuate the gear box and drag link control.

Engine and cab section 1 also includes the power source for the vehicle. This comprises a suitable engine 17, radiator 18, and transmission 19, as well as other associated parts, not shown. The elements of this power source are all mounted on a sub-frame assembly which includes a pair of side rails 20. The vehicle bumper 21 is also preferably attached to the front end of rails 20. Items 17–21 form a complete assembly which is slideable into and out of the cab section. For this purpose, rails 20 are designed to slideably fit into the front portions 22 of chassis frame 5. Bolts 23 or other suitable means secure the power assembly to the frame.

The above-described structure makes it possible to easily remove the power mechanism from the vehicle for repairs. See FIGURE 1. If desired, a substitute assembly may be mounted into the vehicle while the original assembly is being repaired to substantially reduce vehicle down time.

Transmission 19 is suitably and removably connected through drive lines 24, and a transfer case 25 to the front axle differential 26 to drive the vehicle. The connection at the transmission may be easily removed when it is desired to slide the power assembly from the vehicle.

Drive lines 24, transfer case 25 and differential 26 are all disposed, at least in part, in the lower portion of intermediate vehicle section 2. If desired, a platform 27 may be secured to frame 5 above section 2, and a suitable hydraulic oil tank 28 and fuel tank 29 may also be mounted adjacent thereto.

The vehicle is designed to receive refuse and the like and to periodically transfer same to a container removably mounted thereon. For this purpose, section 3, comprises a suitable hopper 30 forming a loading compartment having closed side walls 31 and a closed bottom 32. Hopper 30 is secured within suitable portions of chassis frame 5 and is provided with an open top through which refuse may be manually dumped from garbage cans or the like.

The forward end portion of hopper 30 is normally closed by a reciprocable vertical compaction platen 33 which is adapted to slide rearwardly in the hopper along opposed slide members 34 mounted on frame 5. An extensible-retractable piston-cylinder assembly 35 is connected between the upper portion of the forward face of platen 33 and a cross-bar 36 on frame 5 in intermediate section 2 adjacent engine cab section 1. Assembly 35 may be actuated in any suitable well-known way, as by a control valve 37 connected to tank 28 and assembly 35.

The rearward end portion of hopper 30 is normally open. A generally rectangular removable refuse container 38 is adapted to be supported at section 4, as will be described, and is provided with a front wall 39 having an opening in its lower portion which registers flush with the rear hopper opening to form a channel 40 through which refuse is transferred into the container under the action of platen 33.

As best shown in FIGS. 2 and 5, container 38 forms a refuse storage compartment which is in communication with hopper 30. Container 38 comprises generally a large rectangular enclosure having an upper portion wider than the lower portion to thereby form an overhang 41 for purposes to be described. Container 38 includes a latchable top closure member 42 which may be hinged out of the way or otherwise removed during dumping, as well as a latchable side door 43 for access to the interior. The forward container portion includes a half-door 44 which is provided with a hinge 45 at the upper edge of the front opening. When container 38 is mounted on the vehicle door 44 is hinged upwardly and latched at 46 to clear the opening in wall 39. When the container is removed from the vehicle, it is lowered over the opening and latched closed as at 47.

In accordance with the invention, means responsive to movement of platen 33 are provided for loading container 38 on the vehicle from an off-vehicle position, and vice-versa. For this purpose, the rear portion of chassis frame 5 comprises a pair of skids or rails 48 which include a central horizontal portion 49 which merges through a downwardly inclined portion 50 to a front horizontal support portion 51. Rearwardly, rails 48 merge into a rearward and downwardly inclined ramp 52. A pair of rollers 53 are hung from the front portions of container overhang 41 for supporting said rollers. In addition, a pair of skid supports 54 are hung from overhangs 41 just rearwardly of the center portions thereof.

Assuming that container 38 is on the ground behind and closely adjacent the vehicle, removable mechanical means are provided to connect the container with platen 33. As best shown in FIG. 5, a grooved hook lug 55 is mounted on the face of platen 33 adjacent each upper side edge thereof. In addition, a small opening 56 is disposed in each side wall of the container adjacent channel 40. A link bar 58 is adapted to connect each lug 55 and respective opening 56. For this purpose, the forward end portion of bar 58 includes a transverse pin 59 which fits into the groove of lug 55, and the rearward end includes a horizontal pin 60 which can be inserted into opening 56.

To eliminate the need for precise positioning of container 38 relative to the vehicle, link bar 58 may be adjustable in length, as by making it telescoping and providing a pin 61 on one member which fits in slots 62 on the other member. The pin and slot arrangement limits the amount of telescoping extension and retraction possible.

When container 38 is on the ground, it is of course necessary to move platen 33 to a rearward position before installing link bars 58. Once the installation has taken place, cylinder and piston assembly 35 is actuated to retract platen 33 forwardly, which pulls container 38 up ramp 52 on roller 53. The rollers move along ramp 52, hence to horizontal portion 49 and then down incline 50 to support portion 51. Container 38 thus is raised up, moved forwardly and then lowered into final position. As container 38 moves up ramp 52 on rollers 53, it tends to tilt downwardly in the back. Skid supports 54 which have forwardly facing inclined surfaces, will then engage then ramp to support the rear portion of the container. When the container is at its fully forward position, it will be supported at its forward end portion by support portion 51 and rollers 53. Likewise, the rearward container portion is supported by ramp 53 and skid supports 54, which will be flush with the ramp. See FIG. 2. The rear axle 63 of the vehicle is of the drop center type to permit container 38 to move between the rear wheels. Link bars 58 are then removed and the desired periodic compaction operations performed. That is, when hopper 30 is full of refuse, platen 33 is moved rearwardly to push the refuse into the container. The platen is then retracted and container loading continued until many hopper loads of refuse are compacted tightly into the container. Link bars 58 may then be reinstalled with platen 33 in its forward position, and the platen then is moved rearwardly to remove container 38 from the vehicle.

It is desirable to lock container 38 in position on the vehicle during the compaction operation. For this purpose, a relatively heavy rectangular lug 64 extends outwardly from each rear lower side portion of the container.

Lugs 64 are positioned behind the rear vehicle wheels 6 when container 38 is on the vehicle. As best shown in FIG. 6, an elongated locking channel member 65 is hinged at 66 to frame 5 rearwardly of each rear wheel 6. Member 65 has an open central portion and an end member 67 which is disposed rearwardly of and closely adjacent the respective lug 64 when the channel member 65 is hinged from an out-of-the-way transverse position to a longitudinal locking position over lug 64. An enlarged bolt 68 threadably passes through each end member 67 and lockingly tightens onto the respective lug 64 when the bolt handle 69 is turned.

The vehicle of the invention provides an important advance in the art of refuse collection. It is especially useful as an integral part of a collection system which also includes a series of such vehicles, a large plurality of removable containers, and a number of other transfer vehicles.

Thus, a rendezvous area may be provided with a large number of empty containers. Each collection vehicle picks up an empty container 38 and travels its route to collect refuse from individual homes or the like. When the container is full, it is exchanged at the rendezvous location for an empty container. When a sufficient number of full containers have accumulated at the rendezvous point, a large transfer vehicle may load the contents of numerous containers, and transfer it to a dump or other disposal area. Such a transfer vehicle may be similar to that disclosed in Brisson United States Patent No. 3,016,157, entitled, "Loader Apparatus," and assigned to a common assignee. The transfer vehicle-container connector structure, not shown herein, may also be similar to the structure shown in that patent.

Various modes of carrying out the invention are contemplated as being within the scope of the following claims particularly pointing out and distinctly claiming the subject matter which is regarded as the invention.

I claim:

1. In a vehicle for handling refuse:
   (a) a frame,
   (b) a loading compartment on said frame for receiving refuse,
   (c) a refuse storage compartment removably mounted on said frame rearwardly of said loading compartment and in communication with the latter,
   (d) a compacting platen mounted in said loading compartment and actuatable rearwardly for transferring refuse from said loading compartment into said storage compartment,
   (e) and means responsive to actuated movement of said compacting platen for removing said storage compartment from said frame.

2. The vehicle of claim 1 in which said last named means comprises mechanical connector means removably joining said platen and storage compartment.

3. The vehicle of claim 2 in which said mechanical connector means includes at least one link bar which is of such a length as to be connectable between said platen and storage compartment when said platen is in its forward position.

4. The vehicle of claim 3 in which said link bar is of such a length as to be connectable between said platen and storage compartment when said platen is in its rearward position and said storage compartment is removed from said frame but closely adjacent thereto.

5. The vehicle of claim 1 wherein:
   (a) said frame includes a track having a forward portion and a rearwardly extending downwardly inclined ramp portion,
   (b) said forward portion supports the forward portion of said storage compartment,
   (c) and said storage compartment is constructed and disposed to move down said ramp portion under the control of said last-named means.

6. The vehicle of claim 5 wherein the rearward portion of said storage compartment is supported on said ramp portion.

7. In the vehicle of claim 1: cooperative means between said storage compartment and said frame to removably lock the former to the latter.

8. The vehicle of claim 7 in which said cooperative means comprises:
(a) at least one lug extending outwardly from said storage container,
(b) a channel member on said frame and pivotable thereon into and out of a locking position over said lug,
(c) and bolt means on said channel member and tightenable onto said lug when said channel member is in said locking position.

9. In a vehicle for handling refuse:
(a) a frame,
(b) a loading compartment on said frame for receiving refuse,
(c) a refuse storage compartment removably mounted on said frame rearwardly of said loading compartment and in communication with the latter,
(d) a compacting platen mounted in said loading compartment and actuable rearwardly for transferring refuse from said loading compartment into said storage compartment,
(e) said frame including a track having a forward portion and a rearwardly extending downwardly inclined ramp portion,
(f) said forward portion supporting the forward portion of said storage compartment,
(g) and powered means on said vehicle to move said storage compartment down said ramp portion.

10. In the vehicle of claim 9: means supporting the rearward portion of said storage compartment on said ramp portion.

11. The vehicle of claim 10 wherein said supporting means comprises at least one member secured to said storage container and with said member having an inclined surface portion in flush engagement with said ramp portion when the storage container is in a normal position on said vehicle.

12. In the vehicle of claim 9: cooperative means between said storage compartment and said frame to removably lock the former to the latter.

13. The vehicle of claim 12 in which said cooperative means comprises:
(a) at least one lug extending outwardly from said storage container,
(b) a channel member on said frame and pivotable thereon into and out of a locking position over said lug,
(c) and bolt means on said channel member and tightenable onto said lug when said channel member is in said locking position.

14. In a vehicle for handling refuse:
(a) a frame,
(b) a loading compartment on said frame for receiving refuse,
(c) said frame including support means for removably mounting a refuse storage compartment rearwardly of said loading compartment with the compartments in communication,
(d) a compacting platen mounted in said loading compartment and reciprocable between normal forward position and a rearward position for transferring refuse from said loading compartment into a storage compartment positioned on the frame,
(e) and connector means for joining said platen to a storage compartment for loading or unloading the latter onto or from the vehicle as said platen moves forwardly or rearwardly, respectively.

15. The vehicle of claim 14 in which said connector means includes at least one link bar which is of such a length as to be connectable between said platen and a storage compartment on the vehicle when said platen is in its forward position.

16. The vehicle of claim 15 in which said link bar is of such a length as to be connectable between said platen and a storage compartment when said platen is in its rearward position and a storage compartment is removed from but closely adjacent said frame.

17. The vehicle of claim 15 in which said link bar is extensible and retractible a limited distance.

18. The vehicle of claim 14 wherein said frame includes at least one storage compartment supporting rail having a rearwardly extending downwardly inclined ramp portion for supporting the rearward portion of a storage compartment mounted on the vehicle and for supporting the forward portion of a storage compartment as the latter is loaded onto or unloaded from the vehicle.

19. The vehicle of claim 14 wherein said frame includes at least one storage compartment supporting rail comprising:
(a) an intermediate horizontal portion,
(b) said horizontal portion merging through a forwardly extending downwardly inclined portion into a forward portion for supporting the forward portion of a storage compartment,
(c) and a rearwardly extending downwardly inclined ramp portion for supporting the rearward portion of a storage compartment mounted on the vehicle and for supporting the forward portion of a storage compartment as the latter is loaded onto or unloaded from the vehicle.

References Cited
UNITED STATES PATENTS

| | | | |
|---|---|---|---|
| 3,230,868 | 1/1966 | Smith | 214—83.3 |
| 3,365,087 | 1/1968 | Roedel et al. | 214—83.3 |

ALBERT J. MAKAY, *Primary Examiner.*

U.S. Cl. X.R.

100—100; 180—42, 55, 64, 77, 89; 214—83.3, 390